US010955433B2

(12) United States Patent
Jacob et al.

(10) Patent No.: US 10,955,433 B2
(45) Date of Patent: Mar. 23, 2021

(54) HYBRID MATERIAL AIRCRAFT SENSORS HAVING AN ENCAPSULATED INSERT IN A PROBE WALL FORMED FROM A HIGHER CONDUCTIVE MATERIAL THAN THE PROBE WALL

(71) Applicant: Rosemount Aerospace Inc., Burnsville, MN (US)

(72) Inventors: Robin Jacob, Karnataka (IN); Guru Prasad Mahapatra, Karnataka (IN); Paul Robert Johnson, Prior Lake, MN (US); Greg Seidel, Farmington, MN (US)

(73) Assignee: ROSEMOUNT AEROSPACE INC., Burnsville, MN (US)

( * ) Notice: Subject to any disclaimer, the term of this patent is extended or adjusted under 35 U.S.C. 154(b) by 90 days.

(21) Appl. No.: 15/988,694

(22) Filed: May 24, 2018

(65) Prior Publication Data

US 2019/0293676 A1 Sep. 26, 2019

(30) Foreign Application Priority Data

Mar. 23, 2018 (IN) .............................. 201811010823

(51) Int. Cl.
*G01F 1/46* (2006.01)
*G01P 5/16* (2006.01)
(Continued)

(52) U.S. Cl.
CPC ............ *G01P 5/165* (2013.01); *B22F 3/1055* (2013.01); *G01F 1/46* (2013.01); *G01K 13/028* (2013.01); *G01P 1/026* (2013.01); *G01P 13/025* (2013.01); *B22F 5/106* (2013.01); *B22F 7/062* (2013.01); *B22F 2998/10* (2013.01); *B22F 2999/00* (2013.01); *B29C 64/153* (2017.08); *B33Y 10/00* (2014.12); *B33Y 80/00* (2014.12); *C22C 1/0425* (2013.01); *C22C 1/0433* (2013.01)

(58) Field of Classification Search
None
See application file for complete search history.

(56) References Cited

U.S. PATENT DOCUMENTS 5,296,310 A 3/1994 Kibler et al.
9,664,542 B2 5/2017 Gordon et al.
(Continued)

FOREIGN PATENT DOCUMENTS

FR 3042065 A1 4/2017

OTHER PUBLICATIONS

Ahn, "Applications of laser assisted metal rapid tooling process to manufacture of moulding & forming tools—state of the art", International Journal of Precision Engineering and Manufacturing, vol. 12, No. 5, 1 Oct. 2011, pp. 925-938, Springer.
(Continued)

*Primary Examiner* — Harshad R Patel
(74) *Attorney, Agent, or Firm* — Cantor Colburn LLP

(57) ABSTRACT

An air data probe includes a probe body including a probe wall. The probe body is formed from a first material by direct energy metal deposition. An insert is positioned in the probe wall. The insert is formed from a second material different from the first material. The insert is encapsulated in the probe wall via the direct energy metal deposition.

6 Claims, 3 Drawing Sheets

(51) Int. Cl.
   G01P 5/165   (2006.01)
   G01K 13/02   (2021.01)
   G01P 1/02    (2006.01)
   G01P 13/02   (2006.01)
   B22F 3/105   (2006.01)
   C22C 1/04        (2006.01)
   B33Y 10/00       (2015.01)
   B22F 7/06        (2006.01)
   B33Y 80/00       (2015.01)
   B22F 5/10        (2006.01)
   B29C 64/153      (2017.01)

(56) References Cited

U.S. PATENT DOCUMENTS

| | | | |
|---|---|---|---|
| 9,719,820 B1* | 8/2017 | Jacob | .................. G01P 5/165 |
| 9,772,345 B2 | 9/2017 | Golly et al. | |
| 2008/0085403 A1 | 4/2008 | Sayir | |
| 2016/0304210 A1 | 10/2016 | Wentland et al. | |
| 2017/0030941 A1 | 2/2017 | Sarno et al. | |
| 2017/0199063 A1 | 7/2017 | Gordon et al. | |
| 2017/0219397 A1 | 8/2017 | Jacob et al. | |
| 2018/0356438 A1* | 12/2018 | Jacob | ...................... B22C 9/04 |

OTHER PUBLICATIONS

European Search Report Issued in EP Application No. 19164066.3, dated Aug. 1, 2019, 75 Pages.

Kugler, "Aluminum Encapsulated Apg High Conductivity Thermal Doubler", 49th AIAA/ASME/ASCE/AHS/ASC Structures, Structural Dynamics, and Materials Conference <BR> 16th AIAA/ASME/AHS Adaptive Structures Conference<BR> 10T, Apr. 7, 2008, 6 Pages, Reston, VA.

* cited by examiner

HYBRID MATERIAL AIRCRAFT SENSORS HAVING AN ENCAPSULATED INSERT IN A PROBE WALL FORMED FROM A HIGHER CONDUCTIVE MATERIAL THAN THE PROBE WALL

FOREIGN PRIORITY

This application claims priority to India Patent Application No. 201811010823, filed Mar. 23, 2018, and all the benefits accruing therefrom under 35 U.S.C. § 119, the contents of which in its entirety are herein incorporated by reference.

BACKGROUND

Exemplary embodiments pertain to the art of aircraft sensors such as pitot tubes, and more particularly to ice prevention and removal from such sensors.

A pitot tube is widely used to determine airspeed of an aircraft or other vehicle, or to measure air or gas velocities in industrial applications. In particular, by measuring stagnation pressure of a fluid driven into the pitot tube, together with a measured static pressure, the airspeed of the aircraft can be determined. In certain flight conditions, the pitot tube may be subject to ice accumulation from moisture in the air. For this reason, pitot tubes are equipped with heating elements to prevent such ice accumulation. Further, in other conditions, the pitot tube may ingest ice crystals which then accumulate inside of the pitot tube and cause failure in its operation. A typical pitot tube is substantially cylindrical with an internal diameter containing the heating elements, or coils. Forward of the heating elements is a tip portion that extends radially from forward tip portion to an outer diameter of the pitot tube. An exterior of the typical tube is cylindrical along its length to the inlet. Such a tube has a large surface area of material in the tip portion forward of the heater, and is difficult to heat effectively and therefore to prevent ice accumulation thereon. Further, a large inlet diameter allows for proportionally more ice crystals to be ingested by the pitot tube. Such ingested ice crystals must be melted by the heating elements and drained from the pitot tube.

BRIEF DESCRIPTION

In one embodiment, an air data probe includes a probe body including a probe wall. The probe body is formed from a first material by direct energy metal deposition. An insert is positioned in the probe wall. The insert is formed from a second material different from the first material. The insert is encapsulated in the probe wall via the direct energy metal deposition.

Additionally or alternatively, in this or other embodiments the second material has a higher thermal conductivity than the first material.

Additionally or alternatively, in this or other embodiments the second material is one of annealed pyrolytic graphite (APG), graphite or copper.

Additionally or alternatively, in this or other embodiments the first material is a nickel or copper alloy material.

Additionally or alternatively, in this or other embodiments the insert includes a coating portion of a chromium or nickel material.

Additionally or alternatively, in this or other embodiments the insert includes one or more through openings extending therethrough.

Additionally or alternatively, in this or other embodiments a coating portion of chromium or nickel material at least partially fills the one or more through holes.

Additionally or alternatively, in this or other embodiments the air data probe is one of a pitot tube or a total air temperature probe.

In another embodiment, a method of forming an air data probe includes forming one or more thermally conductive inserts, and encapsulating the one or more inserts into a wall of an air data probe via direct energy metal deposition. The air data probe is formed from a first material and the one or more inserts are formed from a second material different from the first material.

Additionally or alternatively, in this or other embodiments forming the one or more inserts includes forming a base insert portion and applying a coating portion over the base portion.

Additionally or alternatively, in this or other embodiments the base insert portion has a higher thermal conductivity than the first material.

Additionally or alternatively, in this or other embodiments the base insert portion is formed from one of annealed pyrolytic graphite (APG), graphite or copper.

Additionally or alternatively, in this or other embodiments the coating portion is formed from one of a chromium or nickel material.

Additionally or alternatively, in this or other embodiments a suitable heat treatment or hot isostatic pressing is performed the air data probe after encapsulating the one or more inserts.

Additionally or alternatively, in this or other embodiments one or more machining operations are performed on the air data probe after encapsulating the one or more inserts.

Additionally or alternatively, in this or other embodiments the direct energy metal deposition process is laser metal deposition.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
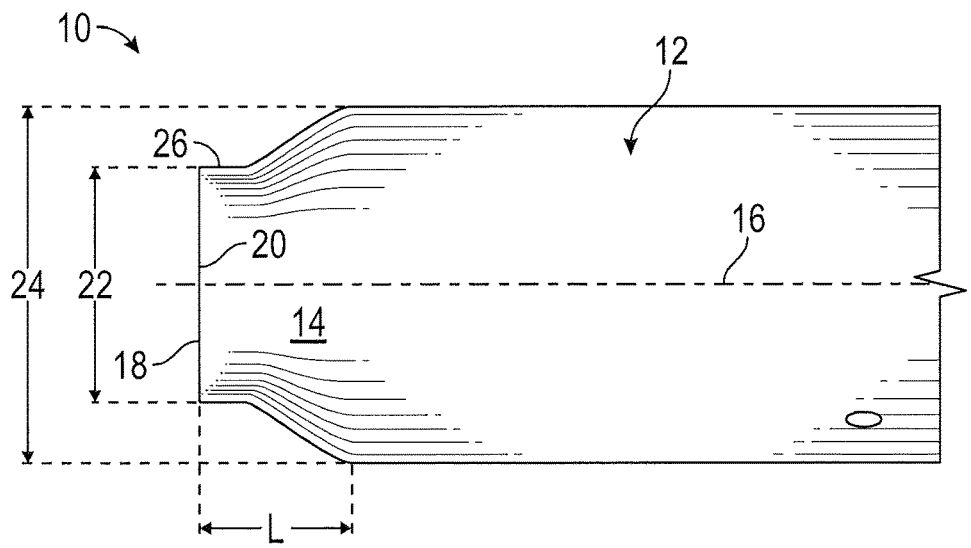
FIG. 1 is an illustration of an embodiment of a pitot tube.

Referring to FIG. 1, illustrated is an embodiment of a sensor, in this embodiment a pitot tube 10. The pitot tube 10 includes a cylindrical body portion 12 and a tip portion 14 extending along a tube axis 16 from the body portion 12 toward a tube inlet 18. In the embodiment of FIG. 1, the tip portion 14 includes an inlet opening 20 having an inlet diameter 22 smaller than a body diameter 24 of the body portion 12. The tip portion 14, between the body portion 12 and the inlet opening 20, tapers in diameter along a concave curve 26. In some embodiments, the concave curve 26 does not extend entirely to the inlet opening 20 as the inlet diameter 22 extends axially from the inlet opening 20 to the concave curve 26. It shall be understood that the curve 26 may be straight or a profile that is aerodynamically suitable in one embodiment.

As shown, the tip portion 14 has a tip length L. The length of the tip may be limited by an ability of a heating element or coils disposed inside the tip to provide heat to it. That is, if the tip is too long, the heater may not be able to heat a distal end thereof such that ice does not form or otherwise accumulate in or on the tip 14.

Figure 2:
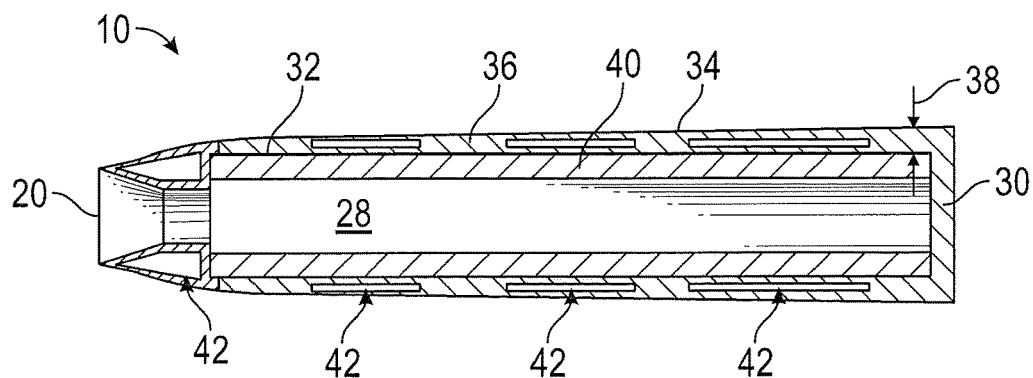
FIG. 2 is a cross-sectional view of an embodiment of a pitot tube.

Referring now to FIG. 2, the pitot tube 10 includes a tube passage 28 extending along an interior of the pitot tube 10 from the inlet opening 20 to a tube end 30. The tube passage 28 is bounded along its length by a tube inner surface 32 that is offset a distance from a tube outer surface 34. Together, the tube outer surface 34 and the tube inner surface 32 define a tube wall 36 having a tube wall thickness 38. In some embodiments, the tube wall thickness 38 is uniform along a tube length, while in other embodiment the tube wall thickness 38 may vary along the tube length. As illustrated, a heating element 40 is disposed within the tube passage 28. The type and configuration of this heating element 40 may include coils or any other type of heating element. In one embodiment, the heating element 40 includes one or more coil wraps disposed at the tube passage 28, the one or more coil wraps establishing a variable watt density along the interior of the pitot tube 10.

Figure 3:
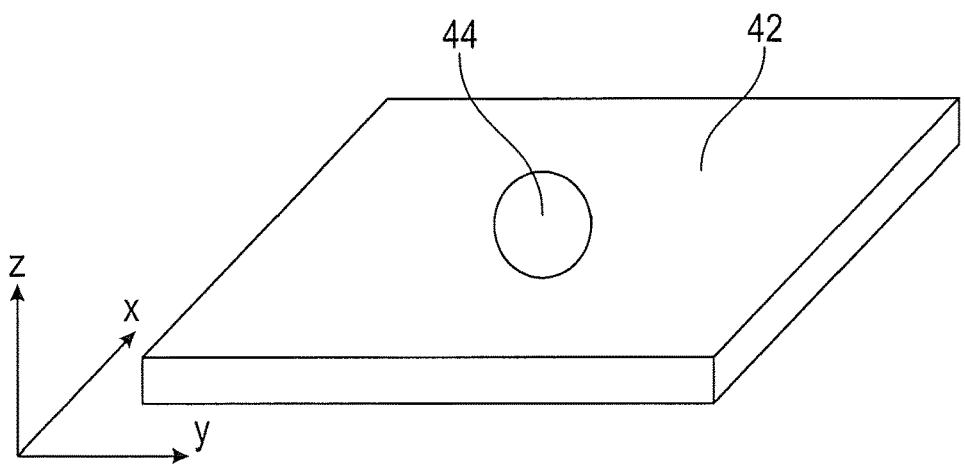
FIG. 3 is a perspective view of an embodiment of an insert for an air data probe.

One or more thermally conductive inserts 42 are located in the tube wall 36, radially between the tube inner surface 32 and the tube outer surface 34. The inserts 42 are utilized to improve heat transfer rates and performance from the heating element 40 throughout the pitot tube 10. As shown in FIG. 2, inserts 42 may be placed along the body portion 12 as well as at the tip portion 14. Referring now to FIG. 3, in some embodiments the inserts 42 are rectilinear in shape, and further may include one or more through openings 44 extending in a heat transfer direction through the insert 42, such as radially outwardly when the insert 42 is in an installed position in the pitot tube 10. The insert 42 is formed from a material having a higher thermal conductivity than a base material of the pitot tube 10. In some embodiments, the insert 42 is formed from, for example, annealed pyrolytic graphite (APG), graphite, or other high thermal conductivity materials such as copper. Typically, the base material of the pitot tube 10 is a nickel alloy or copper alloy material, such as beryllium copper.

Figure 4:
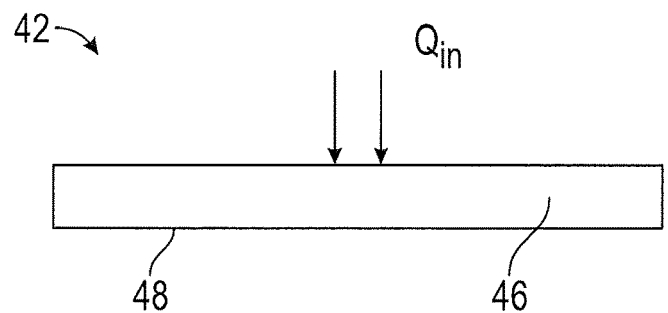
FIG. 4 is a cross-sectional view of an embodiment of an insert for an air data probe.
Figure 5:
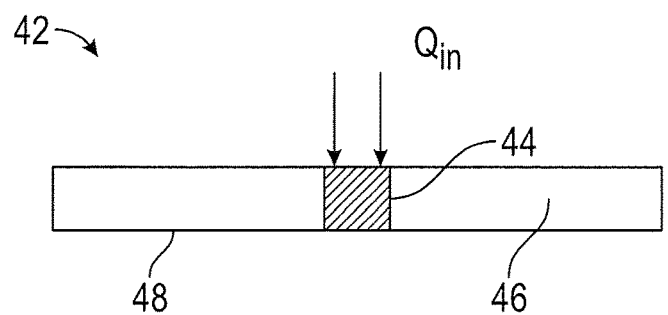
FIG. 5 is another cross-sectional view of an embodiment of an insert for an air data probe.

Referring now to FIG. 4, in some embodiments the insert 42 includes a base insert portion 46 formed from, for example the APG or graphite material or other highly thermally conductive material, and a coating portion 48 encapsulating or covering the base insert portion 46. The coating portion 48 is a chromium or nickel material, and may be applied to the base insert portion 46 by, for example, a plating process or other coating process. As shown in FIG. 5, in embodiments of inserts 42 with through openings 44 in the base portion 46, the coating portion 48 may fill the through openings 44. In other embodiments, the through openings 44 are filled with metal material during direct energy metal deposition manufacturing of the inserts 42. The through openings 44 are provided to improve through plane thermal conductivity of the inserts 42, due to relatively lower through-plane conductivity of the APG inserts 42. In some embodiments, such as when inserts 42 are formed from metal materials, through openings 44 may not be necessary, since metals have isotropic thermal conductivity.

Figure 6:
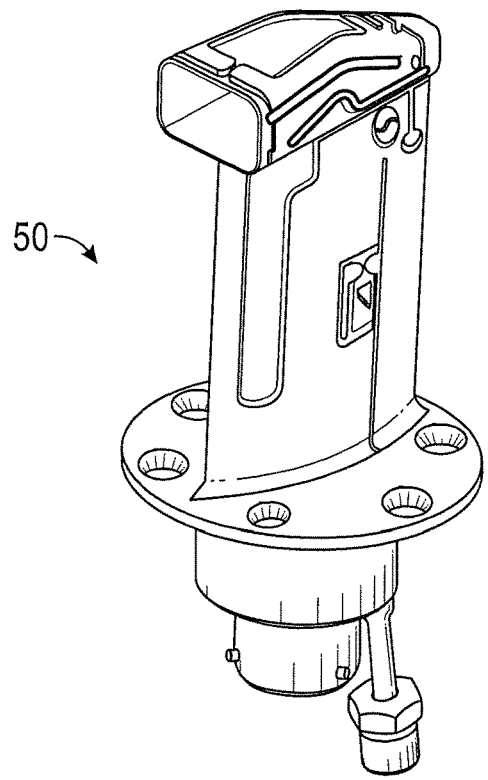
FIG. 6 is a perspective view of an embodiment of a total air temperature probe.
Figure 7:
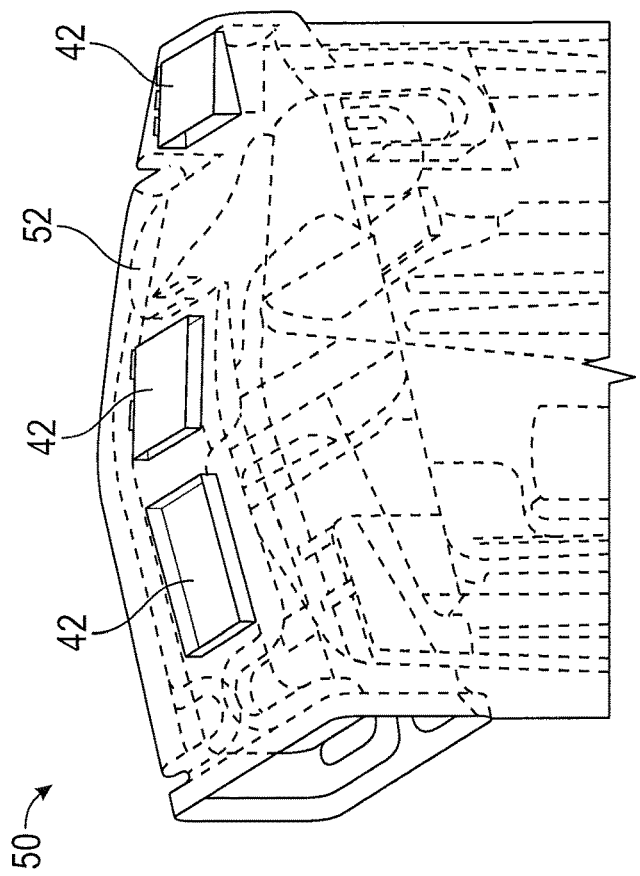
FIG. 7 is a partial cross-sectional view of an embodiment of a total air temperature probe.

While the description above relates to pitot tubes 10, the present disclosure may be readily applied to other air data probes and sensors, such as a total air temperature (TAT) probe 50, shown in FIGS. 6 and 7. The TAT probe 50 includes a probe housing 52, which may include one or more inserts 42 embedded in the probe housing 52.

Figure 8:
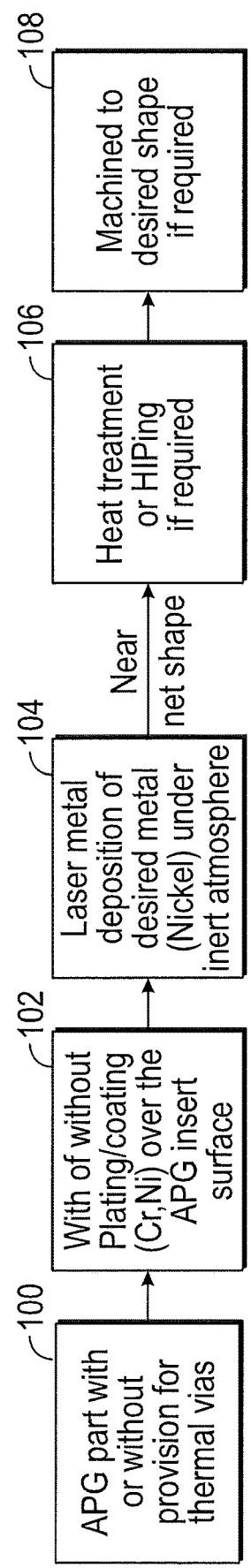
FIG. 8 is a schematic illustration of a method of forming an air data probe.

Referring now to FIG. 8, a method of making an air data probe, such as a pitot tube 10 or a TAT probe 50 is illustrated. In block 100, one or more inserts 42 are formed from, for example, APG. In some embodiments, at block 102 the one or more inserts 42 are plated or coated with, for example, chromium or nickel materials to improve bonding to the pitot tube 10 and prevent oxidation of the insert 42. At block 104, a direct energy metal deposition process, such as laser metal deposition, is performed under inert atmosphere to encapsulate the one or more inserts 42 into a pitot tube 10 having a near-net shape. In block 106, heat treatment or another process, such as hot isostatic pressing (HIP), is performed on the near-net shape pitot tube 10. Finally, at block 108 one or more machining operations are performed on the pitot tube 10 to finalize the shape of the pitot tube 10.

The sensors disclosed herein, including the inserts 42, improves heat transfer of the sensors to prevent and/or alleviate icing conditions at the sensor. Further, forming the sensor via direct energy metal deposition allows the inserts to be readily embedded into the sensors, and the coating of the inserts 42 improves adhesion of the base metal to the inserts 42, and also prevents oxidation of the inserts 42.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An air data probe, comprising:
 a probe body including a probe wall, the probe body formed from a first material by direct energy metal deposition; and
 an insert disposed in the probe wall, the insert formed from a second material different from the first material, the insert entirely encapsulated in the first material via the direct energy metal deposition;
 wherein the second material is one of annealed pyrolytic graphite (APG) or graphite;
 wherein the insert includes one or more through openings extending therethrough, the first material at least partially filling the one or more through openings.

2. The air data probe of claim 1, wherein the second material has a higher thermal conductivity than the first material.

3. The air data probe of claim 1, wherein the first material is a nickel or copper alloy material.

4. The air data probe of claim 1, wherein the insert includes a coating portion of a chromium or nickel material.

5. The air data probe of claim 1, wherein a coating portion of chromium or nickel material at least partially fills the one or more through holes.

6. The air data probe of claim 1, wherein the air data probe is one of a pitot tube or a total air temperature probe.

* * * * *